United States Patent
Patel et al.

(10) Patent No.: US 10,120,887 B1
(45) Date of Patent: Nov. 6, 2018

(54) DEMAND-DRIVEN INITIALIZATION OF DATA STORAGE STRUCTURES

(71) Applicant: EMC IP Holding Company LLC, Hopkinton, MA (US)

(72) Inventors: Dixit Patel, Monroe, NJ (US); Miles A. de Forest, Bahama, NC (US); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 14/867,820

(22) Filed: Sep. 28, 2015

(51) Int. Cl.
*G06F 17/30* (2006.01)

(52) U.S. Cl.
CPC .. *G06F 17/30292* (2013.01); *G06F 17/30958* (2013.01)

(58) Field of Classification Search
None
See application file for complete search history.

(56) References Cited

U.S. PATENT DOCUMENTS

| | | | |
|---|---|---|---|
| 6,275,860 B1 | 8/2001 | DeForest et al. | |
| 7,849,350 B2* | 12/2010 | French | G06F 11/2089 714/3 |
| 8,997,059 B2* | 3/2015 | Wang | G06F 11/362 717/129 |
| 9,009,397 B1* | 4/2015 | Asnaashari | G06F 12/0246 711/103 |
| 9,223,822 B1* | 12/2015 | Vipul | G06F 17/30368 |
| 9,268,495 B2* | 2/2016 | Vogan | G06F 3/0634 |
| 9,305,071 B1* | 4/2016 | Bono | G06F 17/30079 |
| 9,424,116 B2* | 8/2016 | Brodsky | G06F 11/0709 |
| 9,454,326 B1* | 9/2016 | Bono | G06F 3/065 |
| 9,477,409 B2* | 10/2016 | Ramanujan | G11C 7/20 |
| 9,507,787 B1* | 11/2016 | Bono | G06F 17/30091 |
| 9,613,053 B1* | 4/2017 | Shusharin | G06F 17/30233 |
| 9,645,932 B1* | 5/2017 | Bono | G06F 12/0833 |
| 9,830,082 B1* | 11/2017 | Srinivasan | G06F 3/0608 |

OTHER PUBLICATIONS

Automounter, Downloaded Sep. 17, 2015 from https://en.wikipedia.org/wiki/Automounter.

* cited by examiner

*Primary Examiner* — Debbie Le
(74) *Attorney, Agent, or Firm* — BainwoodHuang

(57) ABSTRACT

A technique operable in a data storage system performs initialization of storage structures in multiple stages and allows hosts to request access to a data object even when some of the storage structures supporting the data object have not been initialized. Rather than initializing all storage structures for a data object before allowing host access, a storage processor instead initializes only a protocol stub structure. The protocol stub structure is configured to receive protocol requests from hosts and to initiate further processing should a storage request in that protocol be received. The further processing includes, in response to receiving a protocol request directed to a host-accessible data object, identifying storage structures involved in processing that protocol request and directing the storage processor to initialize those storage structures. Once the storage structures have been initialized, the storage processor may process the protocol request to completion via the initialized storage structures.

21 Claims, 8 Drawing Sheets

DEMAND-DRIVEN INITIALIZATION OF DATA STORAGE STRUCTURES

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

A storage processor running in a data storage system may operate an IO (Input/Output) stack that maintains storage structures used for processing storage requests from hosts. The storage structures are arranged in layers, where each layer represents an internal data storage object, such as a RAID (Redundant Array of Independent Disks) group, an internal LUN (Logical Unit), an internal file system, a storage pool, and so forth. As storage requests arrive from hosts, e.g., requesting read and/or write operations of host-accessible data objects, the storage processor responds to the storage requests by directing them to the IO stack, where they propagate from layer to layer, inducing operations on the storage structures they encounter. The IO stack may then process the storage requests to completion, e.g., by effecting read, write, and/or other operations requested, and by providing the requesting host with data and/or an acknowledgement, for example.

SUMMARY

It is common for a storage processor in a data storage system to serve many host-accessible data objects, such as LUNs, file systems, VVols (virtual volumes, available from VMware, Inc., of Palo Alto, Calif.), and so forth. For example, a storage processor may be configured as the owner of many data objects, and hosts may connect to that storage processor to access them. Also, a storage processor may take over responsibility for serving other host-accessible data objects in the event that another storage processor, which normally serves those other objects, suffers a failure. Thus, a storage processor may be required to serve many host-accessible data objects at a time, and, in a failover situation, may be required to serve some objects quickly and without warning.

Unfortunately, storage processors can require considerable time to initialize storage structures. For example, several seconds or minutes may pass as a storage processor initializes the storage structures for its many host-accessible data objects. Initialization may involve, for example, instantiating instances of storage structures in memory, reading non-volatile storage to establish initial values of properties of the instantiated instances, and so forth. In general, the more host-accessible data objects served by a storage processor, the longer it may take to initialize the storage structures before all the data objects become available to hosts. Delays of this sort are especially troublesome in failover situations, where the time required to initialize storage objects may cause host applications to pause until initializations of storage structures can be completed.

In contrast with the above-described prior approach, in which storage structures for a host-accessible data object must be initialized prior to allowing host access, an improved technique performs initialization in multiple stages and allows hosts to request access to a data object even when some of the storage structures supporting the data object have not been initialized. For example, rather than initializing all storage structures for a data object before allowing host access, the storage processor instead initializes only a protocol stub structure. The protocol stub structure is configured to receive protocol requests from hosts, i.e., storage requests according to a particular protocol, and to initiate further processing should a storage request in that protocol be received. The further processing includes, in response to receiving a protocol request directed to a host-accessible data object, identifying storage structures involved in processing that protocol request and directing the storage processor to initialize those storage structures. Once the storage structures have been initialized, the storage processor may process the protocol request to completion via the initialized storage structures.

Advantageously, the improved technique provides fast initialization of a protocol stub structure but defers slower initializations of other storage structures until access to those structures is actually required. Any need to wait for all storage structures of all data objects to be fully initialized is therefore avoided. Data objects can be made available more quickly after booting a storage processor and are available more quickly after failover.

Further, as failover is often a temporary measure, with failback often occurring soon after, the improved technique hereof avoids overly burdening the target storage processor of failover, as it may never need to consume memory to fully initialize storage structures for data objects if those data objects are never accessed. Thus, the improved technique significantly reduces the burdens on the target storage processor following failover, such that the target storage processor may continue serving its own data objects without suffering any major impact in performance.

In some examples, the improved technique reduces memory usage in a storage processor. For instance, the protocol stub structure has a memory footprint that is generally much smaller than the memory footprint of the fully-initialized storage structures. A storage processor is thus able to operate with a small-footprint protocol stub structure until protocol requests necessitate larger-footprint initializations. In some examples, initialized storage structures are monitored and may be extinguished from memory following periods of inactivity. Thus, it may be possible for a storage processor to operate with lower memory utilization on average over time than would be possible if all storage structures were initialized all the time.

Certain embodiments are directed to a method of managing a data storage system. The method includes performing, by a storage processor within the data storage system, a first initialization procedure, the first initialization procedure creating, in a memory of the storage processor, a protocol stub structure, the protocol stub structure (i) having a first memory footprint in the memory of the storage processor, (ii) configured to receive protocol requests directed to a host-accessible data object served by the data storage system, and (iii) configured to initiate further processing of the protocol requests by the storage processor. The method further includes, after performing the first initialization procedure, receiving, by the protocol stub structure, a protocol request from an application. The protocol request is directed to the host-accessible data object and specifies an action to be performed on the host-accessible data object. In response to receiving the protocol request, the method further includes initiating, by the protocol stub structure, further processing of the protocol request. The further processing includes (i) accessing a dependency graph within the memory to identify a set of storage structures involved in processing the protocol request, (ii) performing a second initialization procedure to initialize the identified set of storage structures in the memory of the storage processor, the set of storage structures, once initialized, together having a second memory footprint that is greater than the first memory footprint, and (iii) processing the protocol request to completion using the set of storage structures.

Other embodiments are directed to a data storage system constructed and arranged to perform a method, such as the method described above. Still other embodiments are directed to a computer program product. The computer program product stores instructions which, when executed by control circuitry of a data storage system, cause the data storage system to perform a method, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique performs initialization of storage structures supporting a host-accessible data object in a data storage system in multiple stages and allows hosts to request access to the data object even when some of the storage structures supporting the data object have not been initialized.

Figure 1:
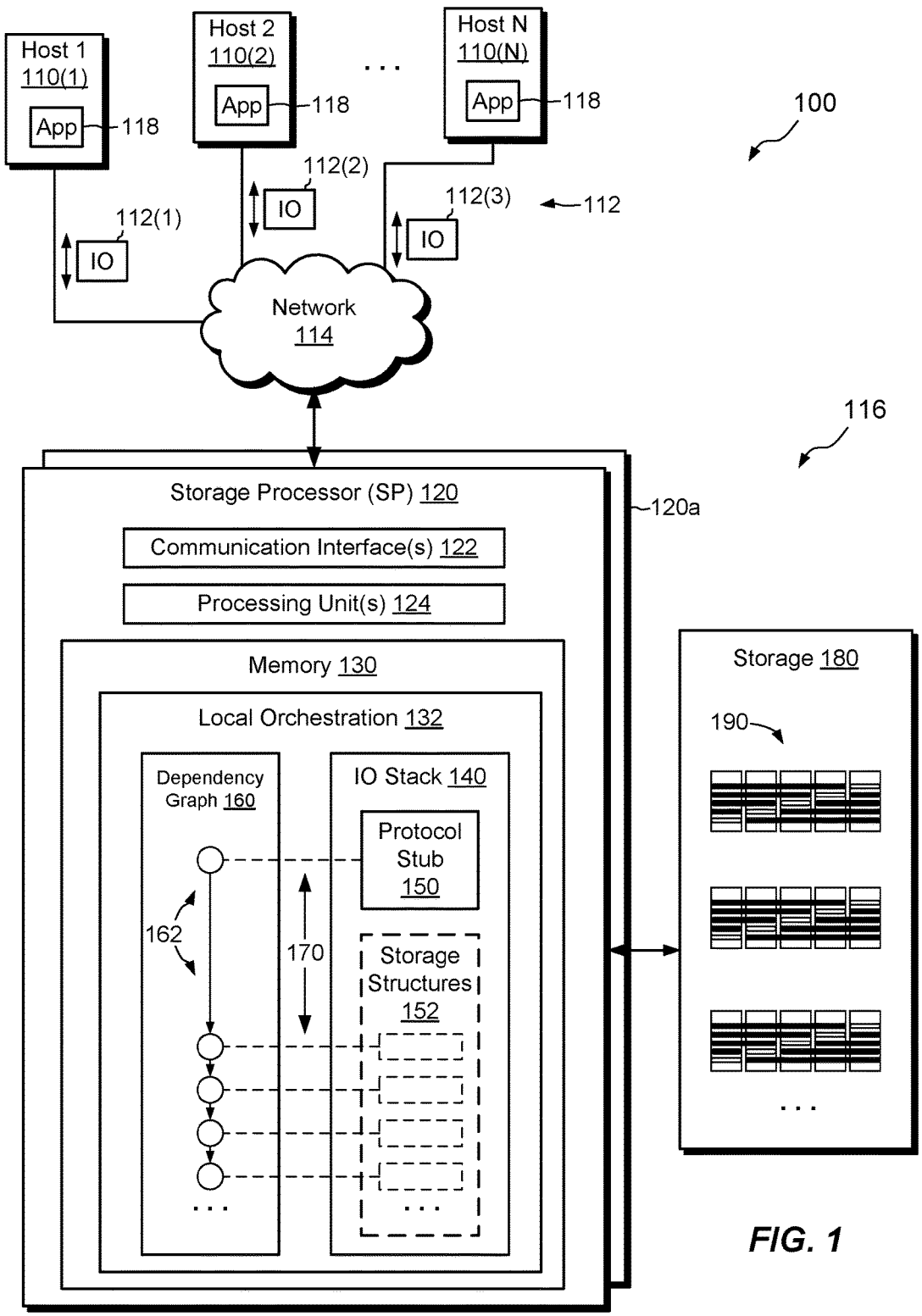
FIG. 1 is a block diagram of an example environment in which embodiments of the invention hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 includes, for example, magnetic disk drives, solid state drives, and/or optical drives and the like, which may be arranged in RAID (Redundant Array of Independent Disks) groups 190. The data storage system 116 may include multiple SPs like the SP 120 (e.g., a second SP, 120a). For example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various protocols, such as Fibre Channel, iSCSI (Internet Small Computer System Interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the SP 120 is configured to receive protocol requests 112 (1-N) according to block-based and/or file-based protocols and to respond to such protocol requests 112(1-N) by reading or writing the storage 180, or by performing other activities.

The SP 120 is seen to include one or more communication interfaces 122, a set of processing units 124, and memory 130. The communication interfaces 122 include, for example, SCSI target adapters and network interface adapters, for converting electronic and/or optical signals received over the network 114 to electronic form for use by the SP 120. The set of processing units 124 includes one or more processing chips and/or assemblies. In a particular example, the set of processing units 124 includes numerous multi-core CPUs and associated co-processors and chipsets. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations defined by the software constructs. Although certain software constructs are specifically shown and described, it is understood that the memory 130 typically includes many other software constructs, which are not shown, such as an operating system, various applications, processes, and daemons.

The memory 130 is seen to include (i.e., to realize by execution of software instructions) a local orchestration environment 132, which controls storage operations within the storage processor 120. An IO stack 140 and a dependency graph 160 operate within the context of the local orchestration 132. The IO stack 140 provides an execution path for host IOs (e.g., protocol requests 112(1-N)). As shown, the IO stack 140 includes a protocol stub structure 150 and (potentially) other storage structures 152. The dependency graph 160 provides a map of storage structures 150 and 152.

In the example shown, only a single protocol stub structure 150 is indicated. However, in some examples, a different protocol stub structure is provided for each protocol used to access data objects hosted by the storage processor 120 (e.g., one for SCSI, one for NFS, one for CIFS, etc.). Also, it should be understood that some or all storage structures 152 may differ from one host-accessible data object to another. Storage structures 152 represent objects in the IO stack 140, such as RAID groups, internal LUNs, storage pools, internal file systems, volumes, and so forth. Some storage structures 152 may be shared among multiple host-accessible data objects, whereas others may be specific to a single host-accessible data object.

The dependency graph 160 maintains dependency relationships among nodes 162, where each node 162 represents a respective storage structure. Dependencies are indicated by arrows between nodes 162, and correspondences with storage structures 152 are indicated by dotted lines 170. The nodes 162 for a first host-accessible data object may include a different node for each storage structure needed to support operation of that data object. Likewise, the nodes 162 for a second host-accessible data object may include a different node for each storage structure needed to support operation of the second host-accessible data object. Some nodes 162 may be common to both data objects, i.e., where the same objects in the IO stack 140 are used to support both, whereas other nodes 162 may be unique to each. Nodes 162 for supporting a third host-accessible data object may be entirely distinct from node supporting the first and second host-accessible data objects. In an example, the dependency graph 160 keeps track of storage structures 150 and 152 for each host-accessible data object served by the storage processor 120. The dependency graph 160 may be implemented as a directed graph stored in nonvolatile memory, such as in the storage 180, and it may be read into main memory for fast access.

In example operation, the storage processor 120 performs initializations of storage structures in stages. For example, the storage processor 120 performs a first initialization procedure upon startup and a second initialization procedure on demand, i.e., in response to receipt of a protocol request to access a host-accessible data object.

The first initialization procedure may be performed, for example, during a boot sequence of the storage processor 120. During the first initialization procedure, the storage processor 120 instantiates the protocol stub structure 150 into the memory 130 and establishes any required settings thereof. If the storage processor 120 hosts multiple data objects and requires more than one protocol, the storage processor 120 may instantiate a different protocol stub structure 150 for each protocol required. It should be understood that each protocol stub structure 150 is generally a lightweight object having a relatively small memory footprint, i.e., it consumes relatively little memory compared with that consumed by the storage structures 152, which together have a much larger memory footprint. Examples of protocol stub structures 150 may include protocol endpoints, for receiving protocol requests 112 in a particular protocol, as well as instructions for locating the data object being addressed and for initiating further processing of protocol requests by the storage processor 120. With the protocol stub structure 150 initialized following the first initialization procedure, the storage processor 120 assumes a "standby" state, in which the storage processor 120 is prepared to receive protocol requests 112 directed to data objects in accordance with the protocol supported by the protocol stub structure 150.

The second initialization procedure is performed on demand, i.e., in response to a protocol request 112 directed to a host-accessible data object. In an example, any of hosts 110(1) to 110(N) runs an application 118, which may issue protocol requests 112 to the storage processor 120. The protocol requests 112 specify actions to be performed on a data object, such as reads, writes, look-ups, and so forth.

Upon issuance of a first protocol request 112 by an instance of the application 118 following completion of the first initialization procedure, the protocol request 112 enters the IO stack 140 and encounter the protocol stub structure 150. The protocol stub structure 150 identifies the particular host-accessible data object addressed by the protocol request 112 (e.g., a particular LUN, file system, or VVol) and directs further processing of the protocol request 112. In an example, the further processing includes accessing the dependency graph 160 to identify from the nodes 162 the storage structures 152 required to support the first protocol request 112 on the addressed data object. The further processing then includes performing the second initialization procedure, to initialize each of the identified storage structures 152 for the identified data object. Initialization of each storage structure 152 may include, for example, instantiating that storage structure into memory 130 and establishing any initial settings thereof.

Once the second initialization procedure is complete, the storage processor 120 processes the first protocol request 112 using the initialized storage structures 152. For example, the storage processor 120 executes methods of the storage structures 152 and/or changes properties thereof to effect the requested action, i.e., read, write, look-up, etc., on underlying hardware. Once initialized, the storage structures 152 may be retained in memory 130, where they remain available for processing other protocol requests 112.

In the manner described, initialization of storage structures 152 is deferred until a protocol request 112 arrives that actually requires those structures 152 to be in place. This deferral of initialization avoids long delays that would ensue if full, up-front initialization of all host-accessible data objects were required. Consequently, data objects can be made available more quickly following storage processor boot-up or failover. Initialization of later-accessed objects is deferred, and some initializations may be deferred indefinitely, e.g., where objects are never accessed. In addition, this deferred initialization technique improves memory utilization in the storage processor 120, as it avoids having to load the relatively large-footprint storage structures into memory 130 until those structures are actually needed.

Also, in some examples, time-outs may apply to certain processes involved in initialization procedures. If all objects are fully initialized at essentially the same time during boot-up, failover, or failback, some processes may time out on account of overly burdened system resources. By waiting for protocol requests to arrive before performing second initialization procedures, however, processing resources are more likely to be spread out over time, reducing the likelihood that time-outs will occur.

Figure 2:
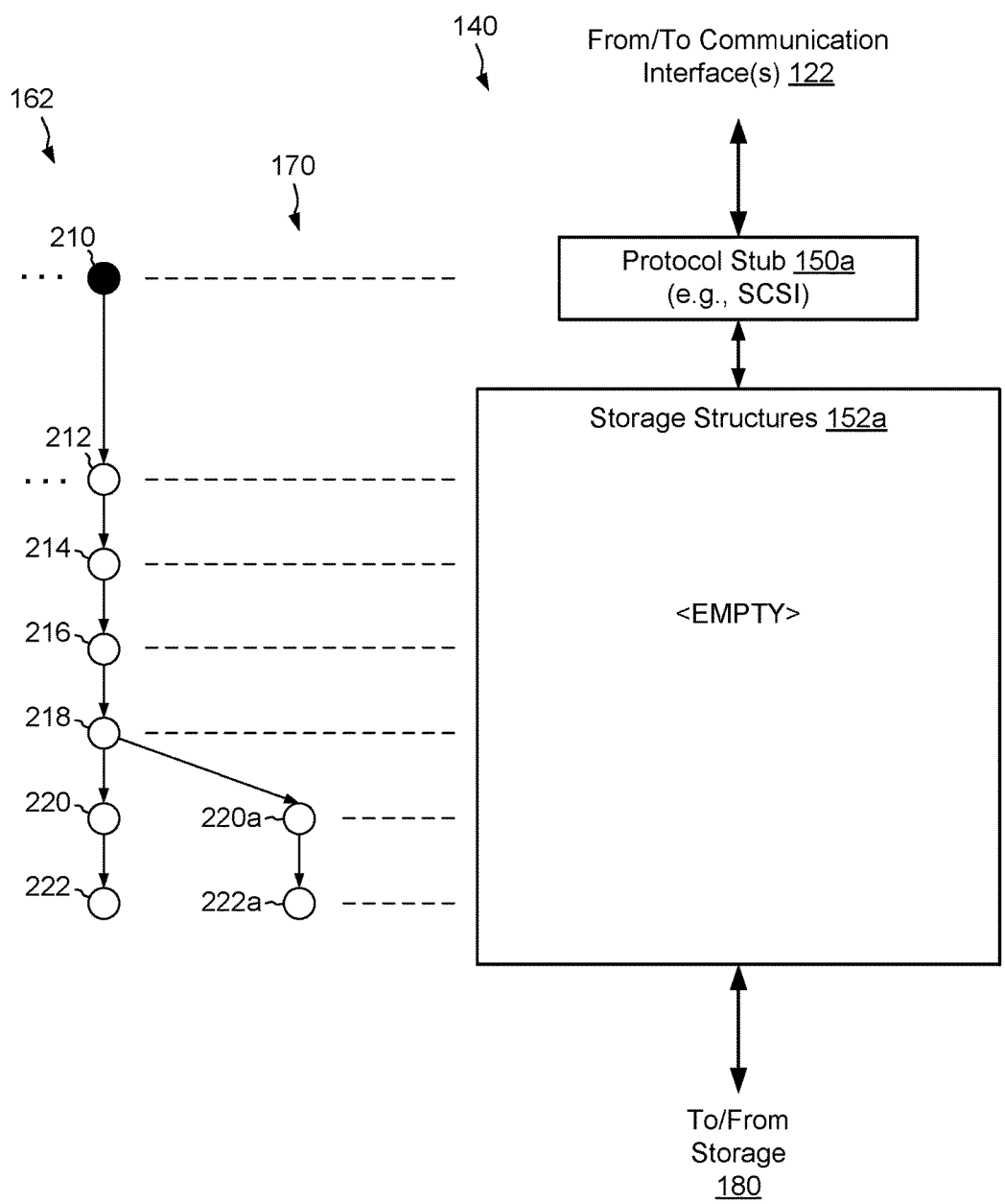
FIG. 2 is a block diagram of an example dependency graph and an example IO stack of FIG. 1 in greater detail, showing an initialized SCSI (Small Computer System Interface) protocol stub structure but no initialized storage structures.

FIG. 2 shows example features of the IO stack 140 and of the dependency graph 160 for a particular host-accessible data object in greater detail. Here, the first initialization procedure has occurred but the second initialization procedure has not. Thus, a protocol stub structure 150a is in place but storage structures 152a are currently empty. It is seen that the protocol stub structure 150a includes a SCSI interface and is thus configured for receiving SCSI requests. In this example, the host-accessible data object is a host LUN.

The nodes 162 shown in FIG. 2 correspond to the storage structures 152a for supporting the host LUN. For example, node 210 corresponds to the protocol stub structure 150a and nodes 212, 214, 216, 218, 220, 220a, 222, and 222a correspond to respective ones of the storage structures 152a that support operation of the host LUN. The ellipsis shown to the left of node 210 indicates that other nodes 162 may be provided for other protocols. The ellipsis shown to the left of node 212 indicates that other nodes 162 may be provided for other data objects accessed through the same protocol.

Nodes shown at different vertical levels correspond to structures at different layers within the IO stack 140, while nodes shown at the same vertical level correspond to structures at the same layer. Also, nodes 162 shown in solid black interiors indicate that the corresponding storage structure has been initialized, while nodes shown with white interiors indicate that the corresponding storage structures have not been initialized. Initialization status of storage structures may be tracked by the dependency graph 160, by the storage structures 152 themselves, or in other ways.

Figure 3:
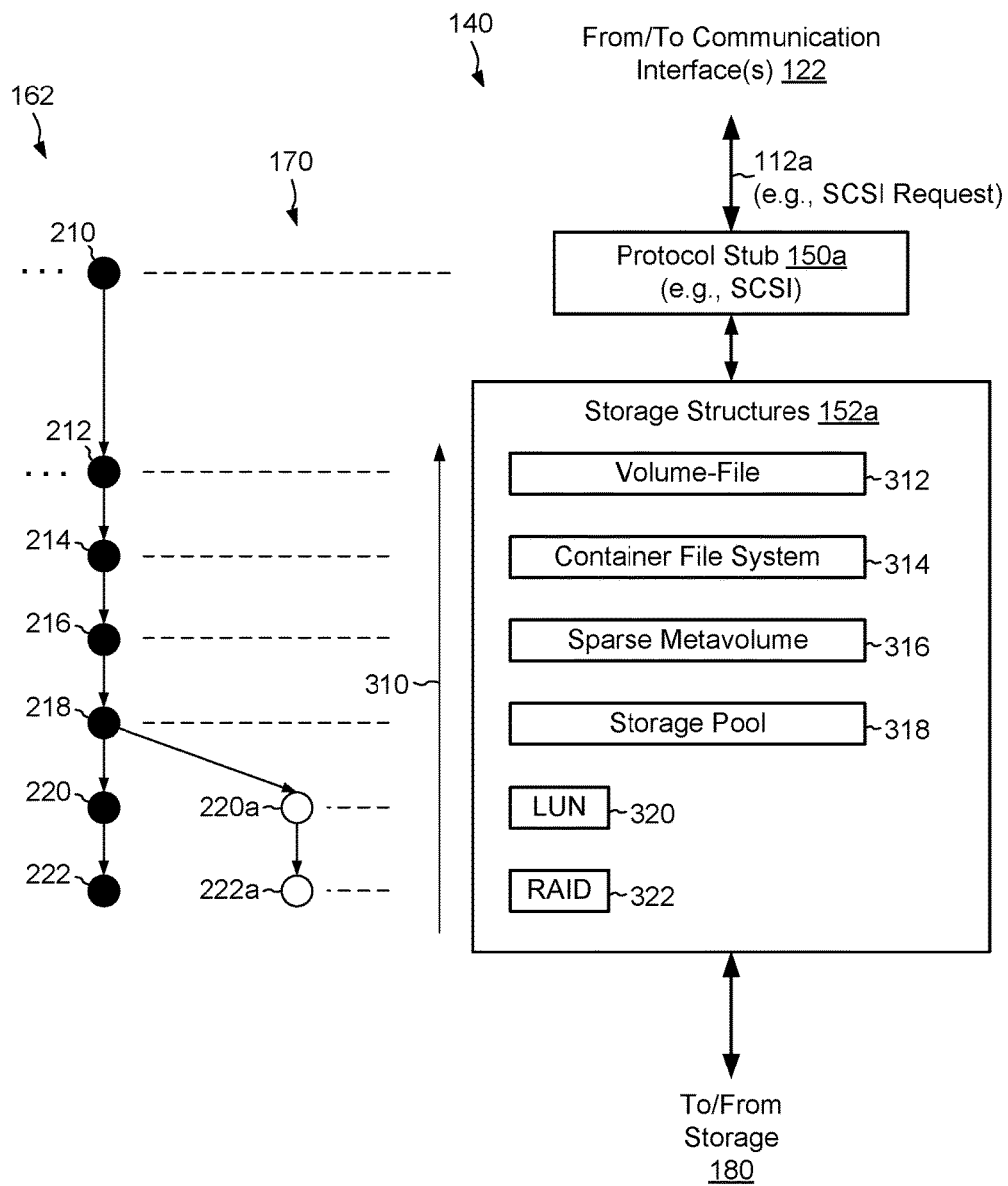
FIG. 3 is a block diagram showing the dependency graph and IO stack of FIG. 2 after receipt of a first SCSI protocol request that resulted in initialization of multiple storage structures.

FIG. 3 shows the same nodes 162 and IO stack 140 as in FIG. 2, but here the second initialization procedure has been performed in response to receipt of a first protocol request 112a directed to the host LUN. As shown, certain storage structures 152a have been initialized to support the action specified by the protocol request 112a. These include, for example, structures for a volume-file 312, a container file system 314, a sparse metavolume 316, a storage pool 318, an internal LUN 320, and a RAID group 322. Corresponding nodes 212, 214, 216, 218, 220, and 222, respectively, are shown in solid black, to indicate that these storage structures have been initialized.

In an example, the second initialization procedure proceeds in direction 310, i.e., from lower layers of the IO stack 140 to higher layers. Thus, for example, RAID group structure 322 is initialized before LUN structure 320, LUN structure 320 is initialized before storage pool structure 318, and so on.

The initialized storage structures 152a establish a layered structure within the IO stack 140 for accessing the host LUN. In an example, the RAID group structure 322 represents one of the RAID groups 190 (FIG. 1) and the internal LUN structure 320 is an expression of that RAID group in the form of a LUN. The internal LUN structure 320 may carve the internal LUN it represents into slices (not shown), with the slices supplied to the storage pool structure 318. In an example, slices are extents of physical storage, with example slice sizes being 256 MB or 1 GB, for example. Slices may be provisioned from the storage pool structure 318 to the sparse metavolume structure 316. The sparse metavolume structure 316 supports the container file system structure 314. Thus, within the IO stack 140, a container file system is built upon a sparse metavolume, which itself is composed from slices supplied from a storage pool, with slices derived from an internal LUN, which is an expression of a RAID group. The container file system structure 314 represents an internal file system, and the volume-file structure 312 represents a file within the container file system. The IO stack 140 expresses the volume-file as a volume, i.e., using SCSI semantics. Thus, in an example, the host LUN, which may be accessed through the protocol stub structure 150a, is an expression of the volume served by the volume-file structure 312.

In this example, the second initialization procedure does not result in initialization of all storage structures used by the host LUN. For example, storage structures corresponding to nodes 220a and 222a of the dependency graph 160 are not initialized. Rather, the second initialization procedure initialized only those storage structures required for completion of the protocol request 112a. Structures corresponding to nodes 220 and 222a are not required.

Figure 4:
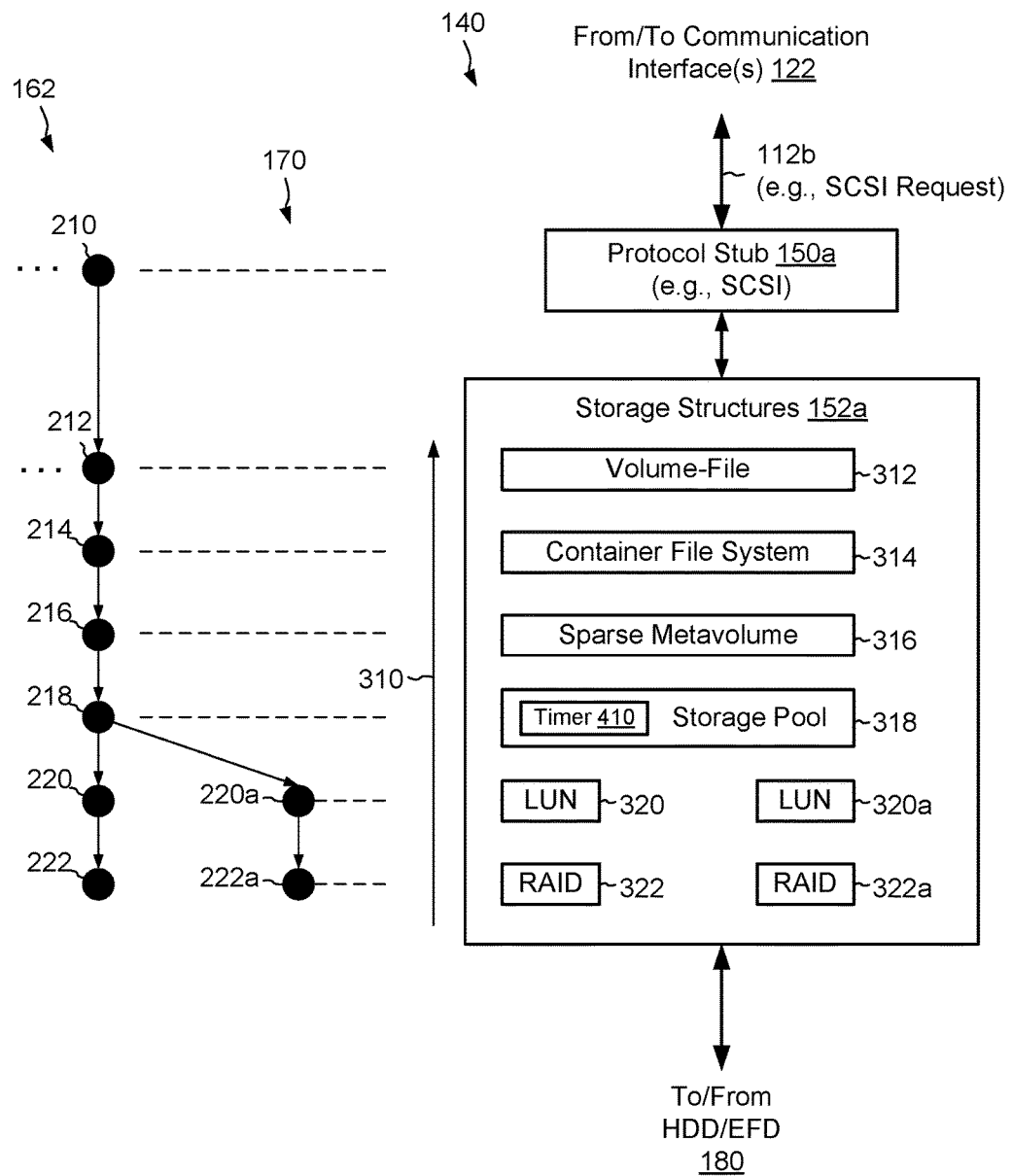
FIG. 4 is a block diagram showing the dependency graph and IO stack of FIGS. 2 and 3 after receipt of a second SCSI protocol request that resulted in initialization of additional storage structures.

FIG. 4 shows the same nodes 162 and IO stack 140 as in FIGS. 2 and 3, but here a third initialization procedure has been performed in response to receipt of a second protocol request 112b directed to the host LUN. In this example, structures 320a and 322a have been initialized to support the second protocol request 112b, and their initialization status is indicated by solid nodes 220a and 222a, respectively. Other nodes shown in solid black in FIG. 3 are already initialized and are thus not initialized again.

In this example, completion of protocol request 112b requires internal LUN structure 320a and RAID group structure 322a to be online, whereas completion of protocol request 112a did not. As before, storage structures are initialized in direction 310. Thus, RAID group structure 322a is initialized before internal LUN structure 320a.

As further shown in FIG. 4, the storage pool structure 318 includes a timer 410. In an example, the timer 410 measures an amount of time since the storage pool structure 318 was last accessed, e.g., since the last time the storage pool structure 318 processed a protocol request 112. In an example, the storage pool structure 318 is configured to monitor the timer 410 and to extinguish itself following a predetermined period of inactivity. By extinguishing itself, the storage pool structure 318 removes itself from memory 130, thus freeing space in memory for other uses. When removing itself, the storage pool object 318 may also remove any subordinate storage structures, such as LUN structures 320 and 320a, and RAID group structures 322 and 322a. In an example, subordinate structures are extinguished in an order opposite the direction 310.

Figure 5:
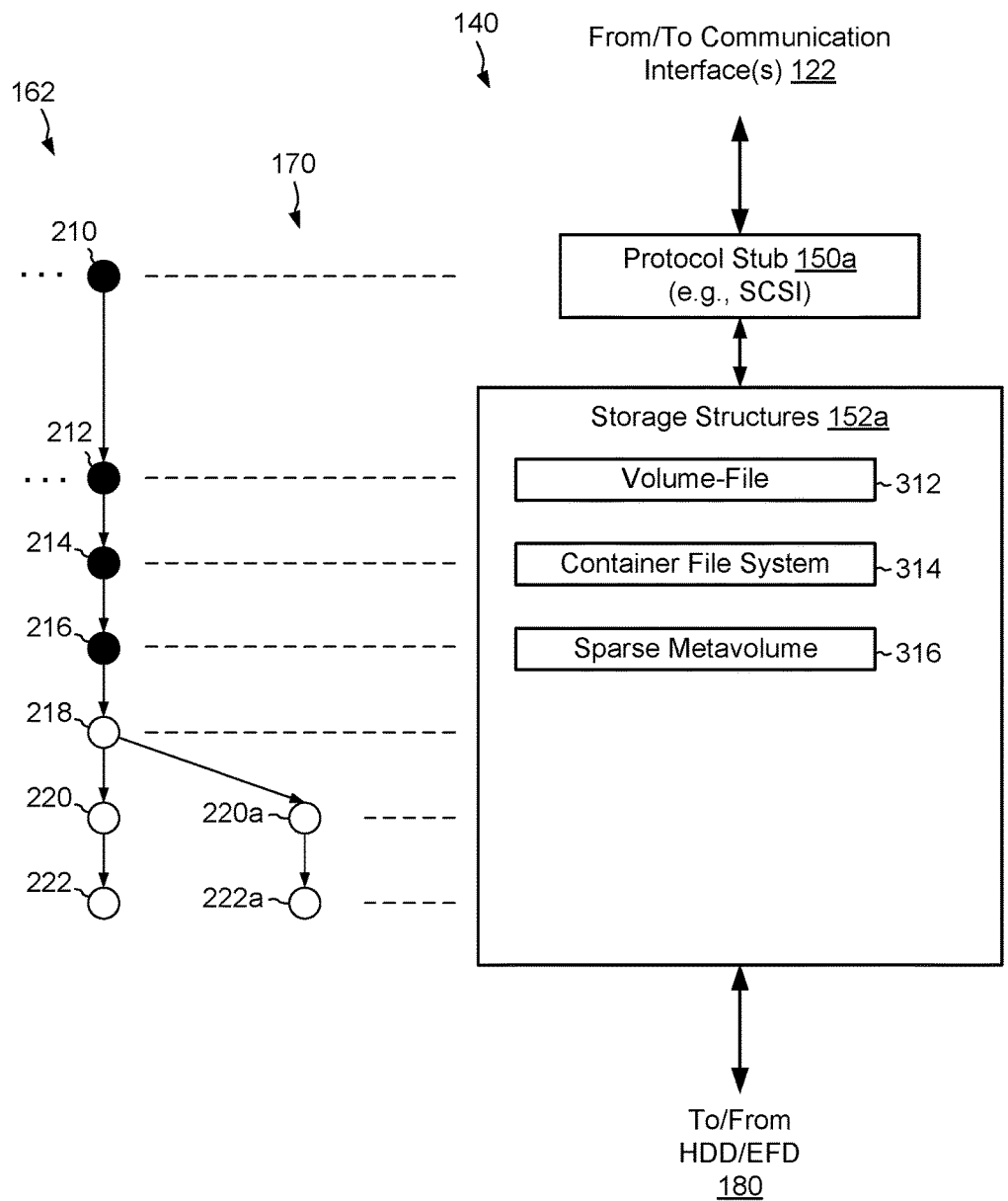
FIG. 5 is a block diagram showing the dependency graph and IO stack of FIGS. 2-4 after a storage structure transitions from an initialized state to an uninitialized state.

FIG. 5 shows an example result of extinguishing the storage pool structure 318. Here, the storage pool structure 318 and its subordinate structures have been removed, and corresponding nodes 218, 220, 220a, 222, and 222a have been changed back to white to indicate an uninitialized state.

Although only the storage pool structure 318 is shown as having a timer 410, it should be understood that any of the storage structures 152*a* may have an associated timer, like the timer 410, and that any of the storage structures 152*a* may be configured to monitor itself and extinguish itself following a period of inactivity. The timer 410 (and similar timers in other structures) need not be implemented within the respective storage structures 152*a*. For example, they may instead be implemented elsewhere, such as in the local orchestration 132 (FIG. 1). Further, the storage structures 152*a* may instead be monitored and extinguished by some other part of the system, such as by the local orchestration 132. Further still, other heuristics besides time may be used in determining when to extinguish storage structures 152*a*.

The ability to extinguish storage structures 152*a* from memory 130 following periods of inactivity has the effect of prioritizing memory resources in favor of recently accessed data objects. Indeed, storage structures 152*a* may be removed from memory 130 for entire host-accessible data objects, significantly freeing memory 130 and focusing memory resources on host-accessible data objects that are most recently used.

Figure 6:
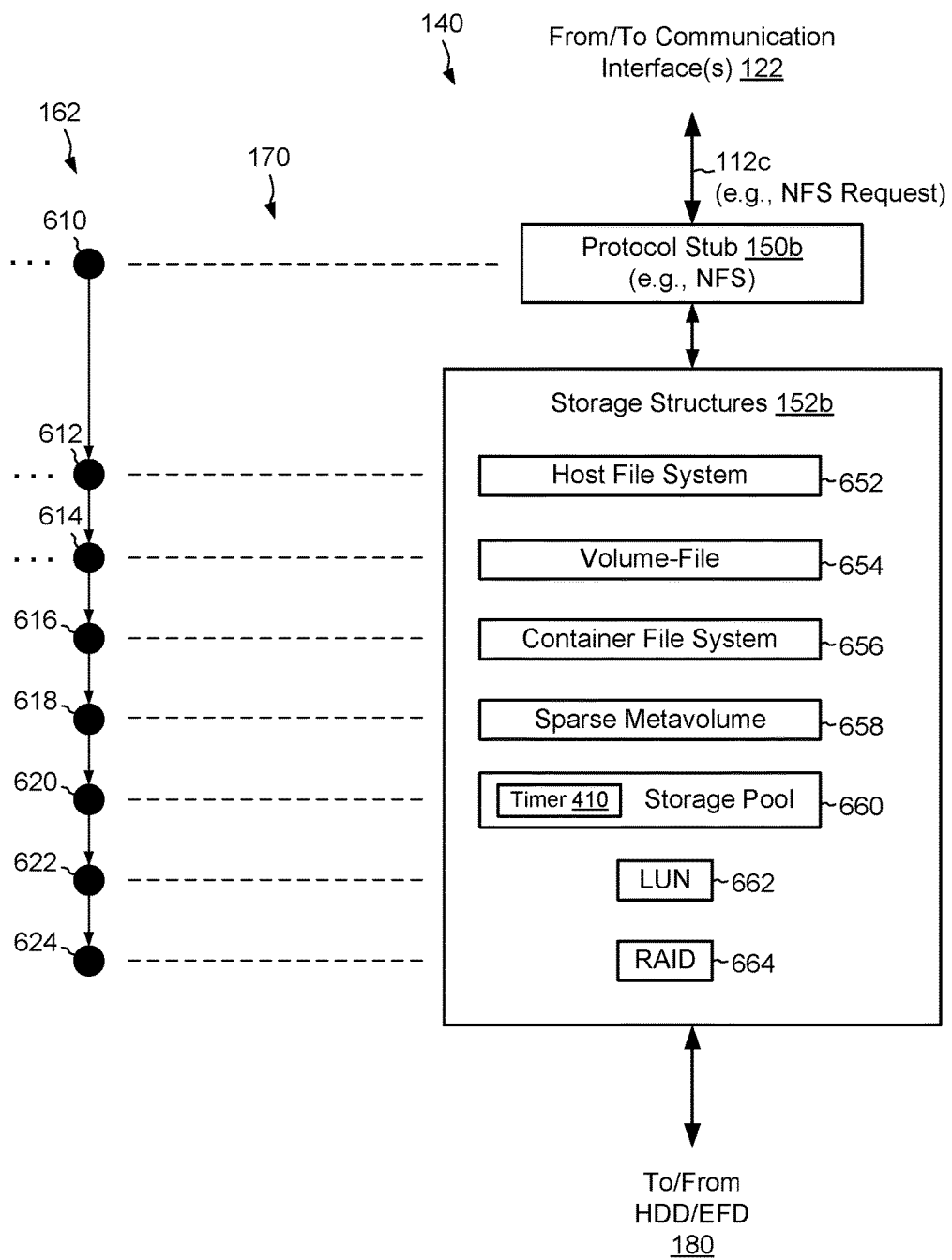
FIG. 6 is a block diagram showing an example dependency graph and an example IO stack of FIG. 1 in greater detail, showing an initialized NFS (Network File System) protocol stub structure and multiple initialized storage structures, which themselves were initialized following receipt of an NFS protocol request.

FIG. 6 shows another example of features of the IO stack 140 and of the dependency graph 160 of FIG. 1. Here, a protocol stub structure 150*b* provides host access to data objects according to the NFS protocol, and the host-accessible data object is a host file system.

The figure shows the state of storage structures 152*b* and nodes 162 following a second initialization procedure. For example, the storage structures 152*b* were initialized in response to receipt of a protocol request 112*c*, which was the first protocol request 112 directed to the host file system after the first initialization procedure. The first initialization procedure initialized the protocol stub structure 150*b* previously, e.g., at boot time.

Here, storage structures 654, 656, 658, 660, 662, and 664 are similar to storage structures 312, 314, 316, 318, 320, and 322, respectively, of FIG. 3. However, storage structures 152*b* further include a host file system structure 652, which represents a host file system built upon the volume-file structure 652. Node 610 corresponds to the protocol stub structure 150*b*, and nodes 612, 614, 616, 618, 620, 622, and 624 correspond to storage structures 652, 654, 656, 658, 662, and 664, respectively. As indicated with the solid black circles, each of these storage structures 152*b* has been initialized.

Figure 7:
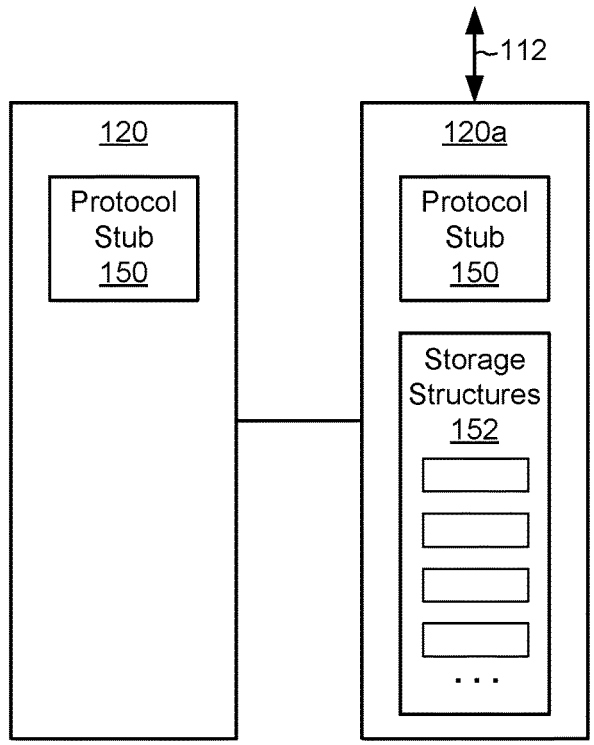
FIG. 7 is a block diagram showing an example arrangement for failing over from a first storage processor to a second storage processor and initializing storage structures on the second storage processor after failover.
Figure 7:
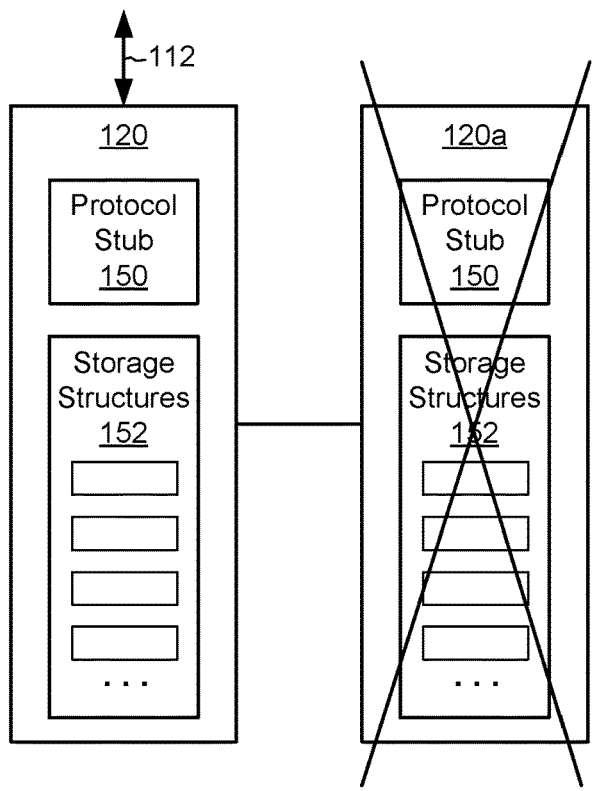

FIG. 7 shows an example arrangement for performing failover between two storage processors in accordance with the improved technique hereof. As shown at the top of the figure, storage processor 120*a* (FIG. 1) serves a host-accessible data object, e.g., by receiving and processing protocol requests 112 directed to that host-accessible data object. The storage processor 120*a* operates a protocol stub structure 150, which was initialized during a first initialization procedure, and storage structures 152, which were initialized during a second initialization procedure. Storage processor 120 has its own initialized protocol stub structure 150 but does not have initialized storage structures 152 for the same data object (although it may have initialized storage structures in place for other data objects that it is responsible for serving to hosts).

As indicated at the bottom of the figure, upon a failure of storage processor 120*a*, storage processor 120 takes over hosting of the host-accessible data object previously served by storage processor 120*a*. Later, upon receipt of a first protocol request 112 directed to that object on storage processor 120, the storage processor 120 performs a second initialization procedure, initializing storage structures 152 for the host-accessible data object previously served by storage processor 120*a*. Storage processor 120 then provides continued access to the host-accessible data object, even after the failure of storage processor 120*a*.

It should be understood that storage processor 120*a* may have been responsible for hosting many data objects, and that responsibility for hosting all of them transferred to storage processor 120 upon failover. As already suggested, however, storage processor 120 may already be responsible for hosting its own data objects. In accordance with the improved technique, storage processor 120 may defer initialization of storage objects for host-accessible data objects transferred-in from storage processor 120*a* until such data objects area actually accessed. Failover is often a transient event, which lasts only until operation of the failed storage processor can be restored. Thus, the improved technique may allow storage processor 120 to avoid initializing storage objects for many data objects, provided no protocol requests directed to those data objects arrive, and thus allows storage processor 120 to conserve its memory resources for operation of its own storage objects. Once failback occurs, the storage processor 120 may extinguish storage structures for transferred-in objects to reclaim memory.

Figure 8:
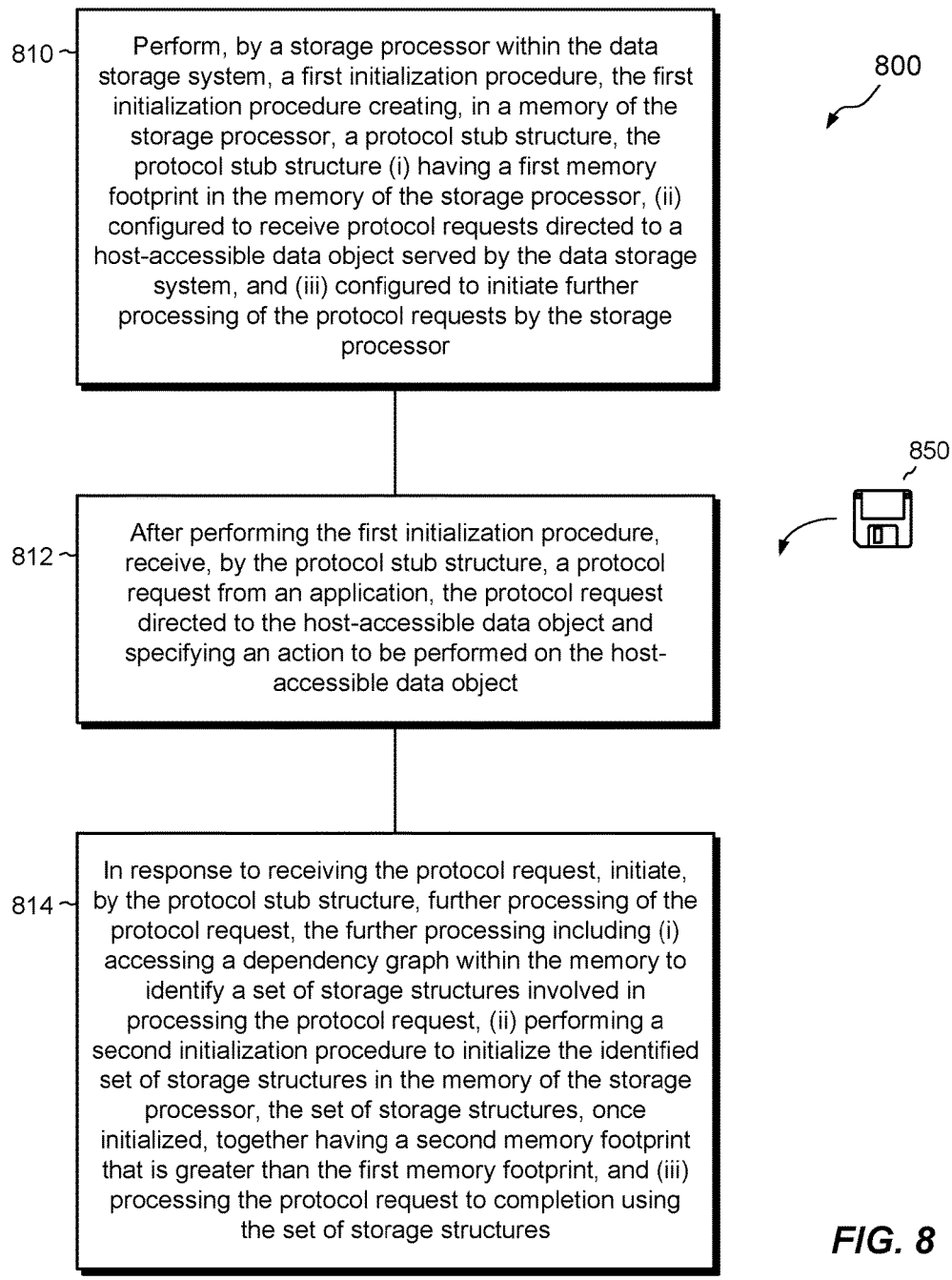
FIG. 8 is a flowchart showing an example method of managing a data storage system.

FIG. 8 shows an example process 800 for managing a data storage system and provides a summary of some of the features described above. The process 800 may be carried out, for example, by the software constructs described in connection with FIG. 1, which reside in the memory 130 and are run by the set of processing units 124. The various acts of the process 800 may be ordered in any suitable way. Accordingly, embodiments may be constructed in which acts are performed in orders different from that illustrated, which may include performing some acts simultaneously, even though the acts are shown as sequential in the illustrated embodiments.

At 810, a first initialization procedure is performed by a storage processor in the data storage system. The first initialization procedure creates, in a memory of the storage processor, a protocol stub structure, the protocol stub structure (i) having a first memory footprint in the memory of the storage processor, (ii) configured to receive protocol requests directed to a host-accessible data object served by the data storage system, and (iii) configured to initiate further processing of the protocol requests by the storage processor. For example, the storage processor 120 initializes the protocol stub structure 150, e.g., during boot-up. The protocol stub structure 150 operates in the TO stack 140 of the storage processor 120 and is configured to receive protocol requests 112 directed to a host-accessible data object. The protocol stub structure 150 is further configured to identify the host-accessible data object being addressed and to initiate further processing of the protocol requests 112.

At 812, after performing the first initialization procedure, the protocol stub structure receives a protocol request from an application. The protocol request is directed to the host-accessible data object and specifies an action to be performed on the host-accessible data object. For example, after the protocol stub structure 150 has been initialized, the storage processor 120 receives a protocol request 112 from an application 118 running on a host. The protocol request 112 specifies an action, such as a read, write, look-up, etc., to be performed on an identified host-accessible data object.

At 814, in response to receiving the protocol request, the protocol stub structure initiates further processing of the protocol request. The further processing includes (i) accessing a dependency graph within the memory to identify a set of storage structures involved in processing the protocol request, (ii) performing a second initialization procedure to initialize the identified set of storage structures in the memory of the storage processor, the set of storage structures, once initialized, together having a second memory footprint that is greater than the first memory footprint, and (iii) processing the protocol request to completion using the set of storage structures. For example, in response to receipt of a first protocol request 112 following the first initialization procedure, the protocol stub structure 150 initiates access to dependency graph 160. The dependency graph 160 includes nodes 162 that identify storage structures 152 upon which the first protocol request 112 depends. The protocol stub structure 150 then initiates a second initialization procedure to initialize each of the storage structures 152 identified in the dependency graph 160. Once the storage structures 152 have been initialized, the first protocol request 112 is processed to completion.

An improved technique has been described for performing initialization of storage structures in multiple stages and allows hosts to request access to a data object even when some of the storage structures supporting the data object have not been initialized. Rather than initializing all storage structures for a data object before allowing host access, the storage processor instead initializes only a protocol stub structure. The protocol stub structure is configured to receive protocol requests from hosts, i.e., storage requests according to a particular protocol, and to initiate further processing should a storage request in that protocol be received. The further processing includes, in response to receiving a protocol request directed to a host-accessible data object, identifying storage structures involved in processing that protocol request and directing the storage processor to initialize those storage structures. Once the storage structures have been initialized, the storage processor may process the protocol request to completion via the initialized storage structures.

Having described certain embodiments, numerous alternative embodiments or variations can be made. For example, as shown and described, a different protocol stub structure 150 is provided for each protocol supported by the storage processor 120. However, this is merely an example. Alternatively, a different protocol stub structure 150 may be provided for each host-accessible data object served by the storage processor. Further, a protocol stub structure 150 may be configured to respond to protocol requests 112 in multiple protocols.

Also, as shown and described, the first initialization procedure performs a initialization of the protocol stub structure 150, which may be just enough to enable host access to data objects but no more. Alternatively, the first initialization procedure may entail initializing a more substantial initialization, which may include initializing a subset of the storage structures 152. For example, lightweight storage structures, having small memory footprints, may be initialized during the first initialization procedure, with heavier storage structures, having larger memory footprints, initialized later, i.e., during the second initialization procedure.

Also, as shown and described, the second initialization procedure takes place in response to a first protocol request and initializes storage structures for a host-accessible data object on an as-needed basis, such that storage structures not required for processing the first protocol request are not initialized. This is merely an example, however. Alternatively, the second initialization procedure may initialize all storage structures 152 for supporting the host-accessible data object, even if some of those storage structures are not required for completing the protocol request.

Further, in some examples, a data storage system may internally trigger a second initialization procedure automatically, even in the absence of a protocol request. For instance, after an initial flurry of first initialization procedures has completed, e.g., upon boot-up, failover, or failback, a data storage system may proactively perform second initialization procedures on host-accessible data objects that it predicts will soon be accessed, e.g., based on previous use patterns. Such second initialization procedures thus prepare the data storage system to respond quickly to protocol requests once they arrive, as second initialization procedures that need to have been run to support responses to those protocol requests have already been performed. In some examples, the data storage system gives second initialization procedures initiated in response to receipt of protocol requests priority over second initialization procedures run proactively.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing a data storage system, the method comprising:

performing, by a storage processor within the data storage system, a first initialization procedure, the first initialization procedure creating, in a memory of the storage processor, a protocol stub structure, the protocol stub structure (i) having a first memory footprint in the memory of the storage processor, (ii) configured to receive protocol requests directed to a host-accessible data object served by the data storage system, and (iii) configured to initiate further processing of the protocol requests by the storage processor;

after performing the first initialization procedure, receiving, by the protocol stub structure, a protocol request from an application, the protocol request directed to the host-accessible data object and specifying an action to be performed on the host-accessible data object; and in response to receiving the protocol request, initiating, by the protocol stub structure, further processing of the protocol request, the further processing including (i) accessing a dependency graph within the memory to identify a set of storage structures involved in processing the protocol request, (ii) performing a second initialization procedure to initialize the identified set of storage structures in the memory of the storage processor, the set of storage structures, once initialized, together having a second memory footprint that is greater than the first memory footprint, and (iii) processing the protocol request to completion using the set of storage structures, wherein the dependency graph includes nodes that identify storage structures upon which the protocol request depends.

2. The method of claim 1, wherein the set of storage structures identified when accessing the dependency graph represents structures configured to operate in an IO stack of the storage processor, the IO stack providing a layered execution path for executing protocol requests, wherein different ones of the set of storage structures are configured to operate at different layers of the IO stack.

3. The method of claim 2, wherein, when processing the protocol request to completion, higher layers of the IO stack receive the protocol request prior to lower layers, wherein the set of storage structures includes a first structure at a first layer of the IO stack, a second structure at a second layer of the IO stack, and a third structure at a third layer of the IO stack, the third layer being below to the second layer and the second layer being below the first layer, and wherein performing the second initialization procedure includes (i) initializing the third structure before initializing the second structure and (ii) initializing the second structure before initializing the first structure.

4. The method of claim 2, further comprising, after performing the second initialization procedure:

receiving, by the protocol stub structure, a second protocol request from the application, the second protocol request directed to the host-accessible data object and specifying a second action to be performed on the host-accessible data object; and in response to receiving the second protocol request, (i) accessing the dependency graph to identify a second set of storage structures involved in processing the second protocol request, the second set of storage system objects including a set of storage structures that were not initialized by the second initialization procedure, (ii) performing a third initialization procedure to initialize the set of storage structures that were not initialized by the second initialization procedure, and (iii) processing the second protocol request to completion using the second set of storage structures.

5. The method of claim 2, wherein performing the first initialization procedure takes place automatically as part of a boot sequence of the storage processor.

6. The method of claim 5, wherein the storage processor is a first storage processor, wherein the data storage system includes a second storage processor, and wherein the method further includes, after performing the first initialization procedure but before performing the second initialization procedure:

operating the second storage processor to respond to protocol requests directed to the host-accessible data object; and upon a failure of the second storage processor, failing over from the second storage processor to the first storage processor, wherein, after performing the second initialization procedure, the first storage processor provides continued access to the host-accessible data object by the application.

7. The method of claim 2, further comprising monitoring activity of a storage structure of the set of storage structures and extinguishing the storage structure from memory following a period of inactivity of the storage structure.

8. The method of claim 7, wherein monitoring the activity of the storage structure and extinguishing the storage structure are performed by the storage structure itself.

9. The method of claim 3, wherein the host-accessible data object is a file system, wherein the protocol request includes an NFS (Network File System) request that specifies a file handle, the file handle identifying the file system and a particular file within the file system, and wherein the protocol stub structure is configured to receive NFS requests specifying file handles and to initiate further processing on such NFS requests.

10. The method of claim 3, wherein the host-accessible data object is a LUN (Logical Unit), wherein the protocol request includes a SCSI (Small Computer System Interface) request that specifies an identifier of the LUN and an offset range within the LUN, and wherein the protocol stub structure is configured to receive SCSI requests specifying LUNs and offset ranges and to initiate further processing on such SCSI requests.

11. The method of claim 1, wherein the host-accessible data object is a file system, wherein the protocol request includes an NFS (Network File System) request that specifies a file handle, the file handle identifying the file system and a particular file within the file system, and wherein the protocol stub structure is configured to receive NFS requests specifying file handles and to initiate further processing on such NFS requests.

12. A data storage system, comprising a storage processor having control circuitry, the control circuitry including a set of processing units coupled to memory, the control circuitry constructed and arranged to:

perform a first initialization procedure, the first initialization procedure creating, in the memory, a protocol stub structure, the protocol stub structure (i) having a first memory footprint in the memory, (ii) configured to receive protocol requests directed to a host-accessible data object served by the data storage system, and (iii) configured to initiate further processing of the protocol requests;

receive, by the protocol stub structure, a protocol request from an application, the protocol request directed to the host-accessible data object and specifying an action to be performed on the host-accessible data object; and in response to receipt of the protocol request, initiate, by the protocol stub structure, further processing of the protocol request, the further processing to (i) access a dependency graph within the memory to identify a set of storage structures involved in processing the protocol request, (ii) perform a second initialization procedure to initialize the identified set of storage structures in the memory, the set of storage structures, once initialized, together having a second memory footprint that is greater than the first memory footprint, and (iii) process the protocol request to completion using the set of storage structures, wherein the dependency graph includes nodes that identify storage structures upon which the protocol request depends.

13. The data storage system of claim 12, wherein the set of storage structures identified from the dependency graph represents structures configured to operate in an IO stack in the memory, the IO stack providing a layered execution path for executing protocol requests, wherein different ones of the set of storage structures are configured to operate at different layers of the IO stack.

14. The data storage system of claim 13,
wherein the control circuitry is further constructed and arranged to provide the protocol request to higher layers of the IO stack prior to providing the protocol request to lower layers of the IO stack,
wherein the set of storage structures includes a first structure at a first layer of the IO stack, a second structure at a second layer of the IO stack, and a third structure at a third layer of the IO stack, the third layer being below to the second layer and the second layer being below the first layer, and
wherein the control circuitry is further constructed and arranged to (i) initialize the third structure before initializing the second structure and (ii) initialize the second structure before initializing the first structure.

15. A computer program product including a set of non-transitory, computer-readable media having instructions which, when executed by control circuitry of a data storage system, cause the control circuitry to perform a method of managing a data storage system, the method comprising:

performing, by a storage processor within the data storage system, a first initialization procedure, the first initialization procedure creating, in a memory of the storage processor, a protocol stub structure, the protocol stub structure (i) having a first memory footprint in the memory of the storage processor, (ii) configured to receive protocol requests directed to a host-accessible data object served by the data storage system, and (iii) configured to initiate further processing of the protocol requests by the storage processor;

after performing the first initialization procedure, receiving, by the protocol stub structure, a protocol request from an application, the protocol request directed to the host-accessible data object and specifying an action to be performed on the host-accessible data object; and in response to receiving the protocol request, initiating, by the protocol stub structure, further processing of the protocol request, the further processing including (i) accessing a dependency graph within the memory to identify a set of storage structures involved in processing the protocol request, (ii) performing a second initialization procedure to initialize the identified set of storage structures in the memory of the storage processor, the set of storage structures, once initialized, together having a second memory footprint that is greater than the first memory footprint, and (iii) processing the protocol request to completion using the set of storage structures, wherein the dependency graph includes nodes that identify storage structures upon which the protocol request depends.

16. The computer program product of claim 15, wherein the set of storage structures identified when accessing the dependency graph represents structures configured to operate in an IO stack of the storage processor, the IO stack providing a layered execution path for executing protocol requests, wherein different ones of the set of storage structures are configured to operate at different layers of the IO stack.

17. The computer program product of claim 16, wherein the method further comprises, after performing the second initialization procedure:

receiving, by the protocol stub structure, a second protocol request from the application, the second protocol request directed to the host-accessible data object and specifying a second action to be performed on the host-accessible data object; and in response to receiving the second protocol request, (i) accessing the dependency graph to identify a second set of storage structures involved in processing the second protocol request, the second set of storage system objects including a set of storage structures that were not initialized by the second initialization procedure, (ii) performing a third initialization procedure to initialize the set of storage structures that were not initialized by the second initialization procedure, and (iii) processing the second protocol request to completion using the second set of storage structures.

18. The computer program product of claim 16, wherein performing the first initialization procedure takes place automatically as part of a boot sequence of the storage processor.

19. The computer program product of claim 18, wherein the storage processor is a first storage processor, wherein the data storage system includes a second storage processor, and wherein the method further includes, after performing the first initialization procedure but before performing the second initialization procedure:

operating the second storage processor to respond to protocol requests directed to the host-accessible data object; and upon a failure of the second storage processor, failing over from the second storage processor to the first storage processor, wherein, after performing the second initialization procedure, the first storage processor provides continued access to the host-accessible data object by the application.

20. The computer program product of claim 16, wherein the method further comprises monitoring activity of a storage structure of the set of storage structures and extinguishing the storage structure from memory following a period of inactivity of the storage structure.

21. The computer program product of claim 16, wherein monitoring the activity of the storage structure and extinguishing the storage structure are performed by the storage structure itself.

* * * * *